US005616530A

United States Patent [19]

Sherwood, Jr. et al.

[11] Patent Number: 5,616,530
[45] Date of Patent: Apr. 1, 1997

[54] HYDROCONVERSION PROCESS EMPLOYING CATALYST WITH SPECIFIED PORE SIZE DISTRIBUTION

[75] Inventors: David E. Sherwood, Jr., Beaumont; Pei-Shing E. Dai, Port Arthur; Charles N. Campbell, II, Austin, all of Tex.

[73] Assignee: Texaco Inc., White Plains, N.Y.

[21] Appl. No.: 564,769

[22] Filed: Nov. 29, 1995

Related U.S. Application Data

[62] Division of Ser. No. 130,472, Oct. 1, 1993, Pat. No. 5,514,273.

[51] Int. Cl.[6] ............................................. B01J 27/18
[52] U.S. Cl. ........................... 502/210; 502/208; 502/211; 502/313
[58] Field of Search ................................. 502/210, 208, 502/211, 313

[56] References Cited

U.S. PATENT DOCUMENTS

| 3,819,533 | 6/1974 | Whitman et al. | 252/455 R |
|---|---|---|---|
| 3,898,184 | 8/1975 | Hara et al. | 252/465 |
| 3,956,459 | 5/1976 | Whitman et al. | 423/213.5 |
| 3,983,072 | 9/1976 | Stephens | 252/460 |
| 4,152,301 | 5/1979 | Summers et al. | 252/466 PT |
| 4,306,965 | 12/1981 | Hensley, Jr. | 208/216 PP |
| 4,520,128 | 5/1985 | Morales | 502/210 |
| 4,941,964 | 7/1990 | Dai et al. | |
| 5,047,142 | 9/1991 | Sherwood, Jr. | |
| 5,397,456 | 3/1995 | Dai et al. | 208/108 |

*Primary Examiner*—Helane Myers
*Attorney, Agent, or Firm*—James L. Bailey; Harold J. Delhommer; Henry H. Gibson

[57] ABSTRACT

Disclosed is a catalyst comprising a porous alumina support bearing 2.5–6 wt % of a non-cobalt Group VIII metal oxide, 14.5–25 wt % of a Group VI-B metal oxide, and 0–4 wt % of a phosphorus oxide, said catalyst having a Total Surface Area of 240–320 $M^2/g$, Pore Volume of 0.65–0.90 cc/g, and a Pore Diameter Distribution whereby 50–62.8% of the Total Pore Volume is present as micropores of diameter 55–115 Å, 27.5–37% of the Total Pore Volume is present in large pores of a diameter greater than 160 Å and 20–30.5% of the Total Pore Volume is present as macropores of diameter greater than 250 Å.

8 Claims, No Drawings

HYDROCONVERSION PROCESS EMPLOYING CATALYST WITH SPECIFIED PORE SIZE DISTRIBUTION

This is a continuation, division, of application Ser. No. 08/130,472, filed Oct. 1, 1993 now U.S. Pat. No. 5,514,273.

FIELD OF THE INVENTION

This invention relates a process for hydrotreating a hydrocarbon feed. More particularly it relates to a hydroconversion process employing catalyst with a specified pore size distribution.

BACKGROUND OF THE INVENTION

As is well known to those skilled in the art, it is desired to convert heavy hydrocarbons, such as those having a boiling point above about 1000° F., into lighter hydrocarbons which are characterized by higher economic value. It is desirable to treat hydrocarbon feedstocks, particularly petroleum residue, to achieve other goals including hydrodesulfurization (HDS), hydrodenitrification (HDN), carbon residue reduction (CRR), and hydrodemetallation (HDM)—the latter particularly including removal of nickel compounds (HDNi) and vanadium compounds (HDV).

These processes typically employ hydrotreating catalysts with specified ranges of pores having relatively small diameters (i.e. micropores, herein defined as pores having diameters less than 250Å) and pores having relatively large diameters (i.e. macropores, herein defined as pores having diameters greater than 250Å).

U.S. Pat. No. 5,397,456 discloses a catalyst composition useful in the hydroconversion of a sulfur- and metal-containing feedstock comprising an oxide of a Group VIII metal and an oxide of a Group V-IB metal and optionally phosphorus on a porous alumina support, the catalyst having a Total Surface Area of 240–310 m²/g, a Total Pore Volume of 0.5–0.75 cc/g, and a Pore Diameter Distribution whereby 63–78% of the Total Pore Volume is present as micropores of diameter 55–115Å and 11–18% of the Total Pore Volume is present as macropores of diameter greater than 250Å. The heavy feedstocks are contacted with hydrogen and with the catalyst such that the catalyst is maintained at isothermal conditions and is exposed to a uniform quality of feed. The process of Dai et al. is particularly effective in achieving desired levels of hydroconversion of feedstock components having a boiling point greater than 1000° F. to products having a boiling point less than 1000° F. The instant invention is distinguished from Dai, et al. U.S. Pat. No. 5,397,4565 in that Dai et al. requires a catalyst with a Pore Diameter Distribution whereby 63–78% of the Total Pore Volume is present as micropores of diameter 55–115Å and 11–18% of the Total Pore Volume is present as macropores of diameter greater than 250Å, whereas, the catalysts employed in the instant invention require a Pore Diameter Distribution whereby only 50–62.8% of the Total Pore Volume is present as micropores of diameter 55–115Å and 20–30.5% of the Total Pore Volume is present as macropores of diameter greater than 250 Å.

U.S. Pat. No. 5,047,142 (to Texaco as assignee of Dai, et al.), discloses a catalyst composition useful in the hydroprocessing of a sulfur and metal-containing feedstock comprising an oxide of nickel or cobalt and an oxide of molybdenum on a porous alumina support in such a manner that the molybdenum gradient of the catalyst has a value of less than 6.0 and 15–30% of the nickel or cobalt is in an acid extractable form, and having a surface area of 150–210 m²/g, a Total Pore Volume (TPV) of 0.50–0.75 cc/g, and a pore size distribution such that less than 25% TPV is in pores having diameters of less than 100 Å, 70.0–85.0% TPV is in pores having diameters of 100–160Å and 1.0–15.0% TPV is in pores having diameters of greater than 250 Å.

U.S. Pat. No. 4,941,964 (to Texaco as assignee of Dai, et al.) discloses a process for the hydrotreatment of a sulfur- and metal-containing feed which comprises contacting said feed with hydrogen and a catalyst in a manner such that the catalyst is maintained at isothermal conditions and is exposed to a uniform quality of feed, the catalyst comprising an oxide of a Group VIII metal, an oxide of a Group VI-B metal and 0–2.0 weight % of an oxide of phosphorus on a porous alumina support, and having a surface area of 150–210 m²/g and a Total Pore Volume (TPV) of 0.50–0.75 cc/g such that 70–85% TPV is in pores having diameters of 100–160Å and 5.5–22.0% TPV is in pores having diameters of greater than 250 Å.

U.S. Pat. No. 4,746,419 (Peck et al.) discloses an improved hydroconversion process for the hydroconversion of heavy hydrocarbon feedstocks containing asphaltenes, metals, and sulfur compounds, which process minimizes the production of carbonaceous insoluble solids and catalyst attrition rates. Peck et al. employs a catalyst which has 0.1 to 0.3 cc/g of its pore volume in pores with diameters greater than 1,200Å and no more than 0.1 cc/g of its pore volume in pores having diameters greater than 4,000Å. The instant invention is distinguished from Peck, et al. (U.S. Pat. No. 4,746,419) in that Peck discloses only features of macropore size distribution useful for minimizing the production of carbonaceous insoluble solids and does not disclose a pore size distribution which would provide additional hydroconversion activity, whereas, the catalysts of the instant invention require a unique pore size distribution so as to provide additional hydroconversion of feedstock components having a boiling point greater than 1000° F. to products having a boiling point less than 1000° F. The instant invention gives improved hydroconversion activity at constant operating conditions compared to the hydroconversion activity of a commercial vacuum resid hydroconversion catalyst having a macropore size distribution which satisfies the requirements of Peck, et al. (U.S. Pat. No. 4,746,419).

U.S. Pat. No. 4,738,944 (Robinson et al.) discloses a catalyst composition useful in the hydrotreatment of hydrocarbon oils, the catalyst containing nickel and phosphorus and about 19–21.5% Mo (calculated as the oxide) on a porous refractory oxide, having a narrow pore size distribution wherein at least 10% TPV is in pores having diameters less than 70Å, at least 75% TPV is in pores having diameters between 50–110Å, at least 60% TPV is in pores having diameters within about 20Å above and below the average pore diameter, and at most 25% TPV, most preferably less than 10% TPV is in pores having diameters greater than 110 Å.

U.S. Pat. No. 4,652,545 (Lindsley et al.) discloses a catalyst composition useful in the hydroconversion of heavy oils, the catalyst containing 0.5–5% Ni or Co and 1.8–18% Mo (calculated as the oxides) on a porous alumina support, having 15–30% of the Ni or Co in an acid extractable form, and further characterized by having a Total Pore Volume (TPV) of 0.5–1.5 cc/g with a pore diameter distribution such that (i) at least 70% TPV is in pores having 80–120Å diameters, (ii) less than 0.03 cc/g of TPV is in pores having diameters of less than 80Å, and (iii) 0.05–0.1 cc/g of TPV is in pores having diameters of greater than 120 Å.

U.S. Pat. No. 4,395,328 (Hensley, Jr. et al.) discloses a process for the hydroconversion of a hydrocarbon stream containing asphaltenes and a substantial amount of metals, comprising contacting the stream (in the presence of hydrogen) with a catalyst present in one or more fixed or ebullating beds, the catalyst comprising at least one metal which may be a Group VI-B or Group VIII metal, an oxide of phosphorus, and an alumina support, where the alumina support material initially had at least 0.8 cc/g of TPV in pores having diameters of 0–1200Å, at least 0.1 cc/g of TPV is in pores having diameters of 1200–50,000Å, and a surface area in the range of 140–190 m$^2$/g, and the support material was formed as a composite comprising alumina and one or more oxides of phosphorus into a shaped material and was thence heated with steam to increase the average pore diameter of the catalyst support material prior to impregnation with active metals. The instant invention is distinguished from Hensley, Jr., et al. (U.S. Pat. No. 4,395,328) in that Hensley, Jr., et al. require that the catalyst support be formed from a composite of alumina and one or more oxides of phosphorus prior to shaping, steam calcining and impregnating with active metals, whereas, the catalyst supports of the instant invention are made from alumina containing at most 2.5 weight percent silica and do not contain phosphorus. The catalyst supports of the instant invention are subsequently impregnated with active metals and optionally, a phosphorus component. The instant invention is further distinguished from Hensley, Jr., et al. (U.S. Pat. No. 4,395,328) in that Hensley, Jr., et al. require that the catalyst support with a relatively low surface area of 140–190 m$^2$/g, whereas the catalyst supports of the instant invention require higher surface areas in the range of 320–365 m$^2$/g.

U.S. Pat. No. 4,395,329 (Le Page et al.) discloses a hydrorefining process of a high metal-containing feedstock employing a catalyst containing alumina, a metal from group VI and a metal from the iron group, the catalyst having a Total Surface Area of 120–200 m$^2$/g, a Total Pore Volume of 0.8–1.2 cc/g, and a Pore Diameter Distribution whereby 0–10% of the Total Pore Volume is present as micropores of with diameters less than 100 Å, 35–60% of the Total Pore Volume is in pores with diameters of 100–600Å, and 35–55% of the Total Pore Volume is present as macropores of diameter greater than 600Å. The instant invention is distinguished from Le Page et al. (U.S. Pat. No. 4,395,329) in that Le Page et al. requires a catalyst with a relatively low surface area of 120–200 m$^2$/g, whereas the catalysts of the instant invention require higher surface areas in the range of 240–320 m$^2$/g.

U.S. Pat. No. 4,341,625 (Tamm) discloses a process for hydrodesulfurizing a metal-containing hydrocarbon feedstock which comprises contacting the feedstock with a catalyst comprising at least one hydrogenation agent (i.e. Group VI-B or Group VIII metal, or combinations thereof) on a porous support, the catalyst being further characterized by having a TPV of 0.5–1.1 cc/g with at least 70% TPV in pores having diameters of 80–150Å and less than 3% TPV in pores having diameters greater than 1000 Å.

U.S. Pat. No. 4,328,127 (Angevine et al.) discloses a catalyst composition for use in the hydrodemetallationdesulfurization of residual petroleum oils, the catalyst comprising a hydrogenating component (i.e. Group VI-B or Group VIII metal, or combinations thereof) on a porous support, and being further characterized by having a TPV of 0.45–1.5 cc/g with 40–75% TPV in pores having diameters of 150–200Å, and up to 5% TPV in pores having diameters of greater than 500 Å.

U.S. Pat. No. 4,309,278 (Sawyer) discloses a process for the hydroconversion of a hydrocarbon feedstock comprising contacting the feedstock with hydrogen and a catalyst in a fixed bed, moving bed, ebullating bed, slurry, disperse phase, or fluidized bed reactor, where the catalyst comprises a hydrogenation component (i.e. Group VI-B or Group VIII metal) on a porous support, and is further characterized by having a TPV of 1.0–2.5 cc/g with no more than 0.05–0.20 cc/g of TPV in pores having diameters of greater than 400 Å.

U.S. Pat. Nos. 4,305,965 and 4,306,965 (Hensley, Jr. et al.) discloses a process for the hydrotreatment of a hydrocarbon stream comprising contacting the stream with hydrogen and a catalyst, the catalyst comprising chromium, molybdenum, and at least one Group VIII metal on a porous support, and further characterized by having a TPV of 0.4–0.8 cc/g with 0–50% TPV in pores having diameters smaller than 50 Å, 30–80% TPV in pores having diameters of 50–100 Å, 0–50% TPV in pores having diameters of 100–150Å, and 0–20% TPV in pores having diameters greater than 150 Å.

U.S. Pat. No. 4,297,242 (Hensley, Jr. et al.) discloses a 2-stage process for the catalytic hydrotreatment of hydrocarbon streams containing metal and sulfur compounds, the process comprising: (i) first contacting the feedstock with hydrogen and a demetallation catalyst comprising a Group VI-B and/or Group VIII metal; and (ii) thereafter reacting the effluent with a catalyst consisting essentially of at least one Group VI-B metal on a porous support, and having a TPV of 0.4–0.9 cc/g and a pore size distribution such that pores having diameters of 50–80Å constitute less than 40% TPV, pores having diameters of 80–100Å constitute 15–65% TPV, pores having diameters of 100–130Å constitute 10–50% TPV, and pores having diameters of greater than 130Å less than 15% TPV.

U.S. Pat. No. 4,089,774 (Oleck et al.) discloses a process for the demetallation and desulfurization of a hydrocarbon oil comprising contacting the oil with hydrogen and a catalyst, the catalyst comprising a Group VI-B metal and an iron group metal (i.e. iron, cobalt, or nickel) on a porous support, and having a surface area of 125–210 m$^2$/g and TPV of 0.4–0.65 cc/g with at least 10% TPV in pores having diameters less than 30Å, at least 50% of pore volume accessible to mercury being in pores having diameters of 30–150Å, and at least 16.6% of pores accessible to mercury being in pores having diameters greater than 300Å. The instant invention is distinguished from Oleck et al. (U.S. Pat. No. 4,089,774) in that Oleck et al. requires a catalyst with a relatively low surface area of 125–210 m$^2$/g, whereas the catalysts of the instant invention require higher surface areas in the range of 240–320 m$^2$/g.

U.S. Pat. No. 4,082,695 (Rosinski et al.) discloses a catalyst for use in the demetallation and desulfurization of petroleum oils, the catalyst comprising a hydrogenating component (i.e. cobalt and molybdenum) on a porous support, and having a surface area of 110–150 m$^2$/g and a pore size distribution such that at least 60% of TPV is in pores having diameters of 100–200Å and not less than 5% TPV is in pores having diameters greater than 500 Å.

U.S. Pat. No. 4,066,574 (Tamm) discloses a catalyst composition useful in the hydrodesulfurization of a hydrocarbon feedstock containing organometallic compounds, the catalyst comprising Group VI-B and Group VIII metal components on a porous support, and having a TPV of 0.5–1.1 cc/g with a pore diameter distribution such that at least 70% TPV is in pores of diameters of 80–150Å and less than 3% TPV is in pores having diameters greater than 1000 Å.

U.S. Pat. No. 4,051,021 (Hamner) discloses a catalytic process for the hydrodesulfurization of a hydrocarbon feed which comprises contacting the feed with hydrogen and a catalyst, the catalyst comprising a Group VI-B and Group VIII metal on a porous support, and having a TPV of 0.3–1.0 cc/g with a pore diameter distribution such that greater than 50% TPV is in pores of diameters of 70–160Å, and pores having diameters below 70Å and above 160Å are minimized.

U.S. Pat. No. 4,048,060 (Riley) discloses a two-stage process for hydrodesulfurizing a heavy hydrocarbon feed which comprises: (i) contacting the feed with hydrogen and a first catalyst to produce a first hydrodesulfurized hydrocarbon product, the first catalyst comprising a Group VI-B and Group VIII metal on a porous support and having a mean pore diameter of 30–60Å; and (ii) contacting the first hydrodesulfurized hydrocarbon product with hydrogen and a second catalyst under hydrodesulfurization conditions, the second catalyst comprising a Group VI-B and Group VIII metal on a porous support and being further characterized by having a TPV of 0.45–1.50 cc/g with 0–0.5 cc/g of TPV in pores having diameters greater than 200 Å, 0–0.05 cc/g of TPV in pores having diameters below 120Å, and at least 75% TPV in pores having diameters ±10Å of a mean pore diameter of 140–190 Å.

U.S. Pat. No. 3,876,523 (Rosinski et al.) discloses a process for the demetallizing and desulfurizing of residual petroleum oil comprising contacting the oil with hydrogen and a catalyst, the catalyst comprising a Group VI-B and Group VIII metal on a porous support and having a pore size distribution such that greater than 60% TPV is in pores having diameters of 100–200Å, at least 5% TPV is in pores having diameters greater than 500Å, and 10% TPV or less is in pores having diameters less than 40Å, and the surface area of the catalyst is 40–150 $m^2/g$.

U.S. Pat. No. 3,770,617 (Riley et al.) discloses a process for the desulfurization of a petroleum hydrocarbon feed comprising contacting the feed with hydrogen and a catalyst, the catalyst comprising a Group VI-B or Group VIII metal on a porous support and having greater than 50% TPV in pores of 30– 80Å, less than 4% TPV in pores having diameters 200–2000Å, and at least 3% TPV in pores having diameters greater than 2000 Å.

U.S. Pat. No. 3,692,698 (Riley et al.) discloses a catalyst useful in hydroprocessing of heavy feed stocks, the catalyst comprising a mixture of Group VI-B and Group VIII metals on a porous support and having a pore size distribution such that a major portion of its TPV is in pores of diameters ranging from 30–80Å, less than 4% TPV is in pores of diameters of 200–2000Å, and at least 3% TPV is in pores of diameters greater than 2000 Å.

Early petroleum distillate hydrotreating catalysts generally were monomodal catalysts with very small micropore diameters (less than say 100Å) and rather broad pore size distributions. First generation petroleum resid hydrotreating catalysts were developed by introducing a large amount of macroporosity into a distillate hydrotreating catalyst pore structure to overcome the diffusion resistance of large molecules. Such catalysts, which are considered fully bimodal HDS/HDM catalysts, are typified by U.S. Pat. Nos. 4,746,419, 4,395,328, 4,395,329, and 4,089,774 supra.

Another approach to developing improved catalysts for petroleum resid processing has involved enlarging the micropore diameters of essentially monomodal catalysts (having no significant macroporosities) to overcome the above described diffusion limitations. Essentially monomodal catalysts with small micropore diameters and low macroporosities designed for improved petroleum resid HDS include those disclosed in U.S. Pat. Nos. 4,738,944; 4,652,545; 4,341,625; 4,309,378; 4,306,965; 4,297,242; 4,066,574; 4,051,021; 4,048,060 (1st stage catalyst); 3,770,617; and 3,692,698, supra. Essentially monomodal catalysts with larger micropore diameters and low macroporosities designed for improved petroleum resid HDM include those disclosed in U.S. Pat. Nos. 4,328,127; 4,309,278; 4,082,695; 4,048,060 (2nd stage catalyst); and 3,876,523, supra.

A recent approach to developing improved catalysts for petroleum resid processing has involved the use of catalysts having micropore diameters intermediate between the above described monomodal HDS and HDM catalysts, as well as sufficient macroporosities so as to overcome the diffusion limitations for petroleum bottoms HDS (i.e., sulfur removal from hydrocarbon product of a hydrotreated petroleum resid having a boiling point greater than 1000° F.) but limited macroporosities to limit poisoning of the interiors of the catalyst particles. Catalysts with micropore diameters intermediate between the above described monomodal HDS and HDM catalysts with limited macroporosities include those of U.S. Pat. No. 4,941,964 and U.S. Pat. No. Patent 5,047,142 supra.

However, none of the above-identified catalyst types, which improve hydrodesulfurization and/or hydrodemetallation, have been found to be effective for achieving improved levels of hydroconversion of feedstocks components having a boiling point greater than 1000° F. to products having a boiling point less than 1000° F. In particular, none of the above-identified catalyst types have been found to be effective for achieving improved levels of hydroconversion when operated under the same process conditions as those employed with first generation petroleum resid hydrotreating catalysts. Undesirable low levels of hydroconversion represent a problem which is particularly acute for those refiners who operate vacuum resid hydroprocessing units at their maximum heat and/or temperature limits. Such limits often exist when refiners are operating at maximum charge rates.

A recent approach to developing such catalysts for the improved hydroconversion of feedstock components having a boiling point greater than 1000° F. to products having a boiling point less than 1000° F. has involved the use of catalysts having micropores intermediate between the abovedescribed monomodal HDS and HDM catalysts with rather more pore volumes in the HDS type of range and with sufficient macroporosities so as to overcome the diffusion limitations for conversion of feedstock components having boiling points greater than 1000° F. into products having boiling points less than 1000° F. but limited macroporosities so as to limit poisoning of the interiors of the catalyst particles. Such catalysts are described in U.S. Pat. No. 5,397,456 supra.

It is another feature of the prior art, particularly petroleum resid processing prior art, that it has not heretofore always been possible to carry out the desirable levels of hydroconversion of such feedstocks to attain desirable results as measured by conversion without the undesirable formation of sediment.

The charge to a hydroconversion process is typically characterized by a very low sediment content of 0.01 weight percent (w %) maximum. Sediment is typically measured by testing a sample by the Shell Hot Filtration Solids Test (SHFST). See Jour. Inst. Pet. (1951) 37 pages 596–604 Van Kerknoort et al.—incorporated herein by reference. Typical prior art hydroprocessing processes commonly yield Shell Hot Filtration Solids of above about 0.19 w % and as high as about 1 w % in the 650° F.+ product recovered from the bottoms flash drum (BFD). Production of large amounts of sediment is undesirable in that it results in deposition in downstream units which in due course must be removed. This of course requires that the unit be shut down for an undesirable long period of time. Sediment is also undesirable in the products because it deposits on and inside various pieces of equipment downstream of the hydroprocessing unit and interferes with proper functioning of e.g. pumps, heat exchangers, fractionating towers, etc.

Undesirable high levels of sediment formation, however, are not usually experienced by those refiners who operate vacuum resid hydroprocessing units at or near their maximum heat and feedstock charge rates. Such units are generally operating at moderate conversion levels of feedstock components having boiling points greater than 1000° F. into products having boiling points less than 1000° F. (say, 40–65 volume percent—vol %—conversion) and at relatively low values of sediment. Sediment formation is still of concern, however, in processes such as that of the instant invention, employing catalysts to achieve improved levels of hydroconversion.

We have found it very useful to employ the IP 375/86 test method for the determination of total sediment. The test method is also described in ASTM Designation D 4870–92—incorporated herein by reference. The IP 375/86 method was designed for the determination of total sediment in residual fuels and is very suitable for the determination of total sediment in our 650° F.+ boiling point product. The 650° F.+ boiling point product can be directly tested for total sediment which is designated as the "Existent IP Sediment value." We have found that the Existent IP Sediment Test gives essentially equivalent test results as the Shell Hot Filtration Solids Test described above.

We have noted, however, that even 650° F.+ boiling point products which give low Existent IP Sediment values, may produce additional sediment upon storage. Thus, we have developed a more severe test for sediment. In this modified test, 50 grams of 650° F.+ boiling point product are heated to about 90° C. and mixed with about 5 milliliters of reagent grade hexadecane. The mixture is aged for about one hour at about 100° C. The resultant sediment is then measured by the IP 375/86 test method. The values obtained from this modified test are designated the "Accelerated IP Sediment values."

As it is recommended that the IP 375/86 test method be restricted to samples containing less than or equal to about 0.4 to 0.5 w % sediment, we reduce sample size when high sediment values are observed. This leads to fairly reproducible values for even those samples with very large sediment contents.

It is an object of this invention to provide a process for hydroconverting a charge hydrocarbon feed, particularly, to hydroconvert feedstock components having boiling points greater than 1000° F. into products having boiling points less than 1000° F. It is a second object of this invention to provide improved conversion at low Existent IP sediment values in the 650° F.+ boiling point product. Other objects will be apparent to those skilled in the art.

STATEMENT OF THE INVENTION

In accordance with certain of its aspects, this invention is directed to a process for hydrotreating a charge hydrocarbon feed containing components boiling above 1000° F., and sulfur, metals, and carbon residue which comprises contacting said charge hydrocarbon feed with hydrogen at isothermal hydrotreating conditions in the presence of, as catalyst, a porous alumina support bearing 2.5–6 w % of a non-cobalt Group VIII metal oxide, 14.5–24 w % of a Group VI-B metal oxide, and 0–6 w % of a phosphorus oxide, said catalyst having a Total Surface Area of 240–320 $m^2/g$, a Total Pore Volume of 0.65–0.90 cc/g, and a Pore Diameter Distribution whereby 50–62.8% of the Total Volume Pore is present as micropores of diameter 55–115Å and 20–30.5% of the Total Pore Volume is present as macropores of diameter greater than 250Å, thereby forming hydrotreated product containing decreased content of components boiling above 1000° F. and sulfur, metals, and carbon residue; and recovering said hydrotreated product containing decreased content of components boiling above 1000° F., and of sulfur, metals, and carbon residue; and recovering said hydrotreated product containing decreaed content of components boiling above 1000° F., and of sulfur, metals, and carbon residue.

DESCRIPTION OF THE INVENTION

The charge hydrocarbon feed which may be charged to the process of this invention may include heavy, high boiling petroleum cuts typified by gas oils, vacuum gas oils, petroleum cokes, residual oils, vacuum resid, etc. The process of this invention is particularly useful to treat high boiling oils which contain components boiling above 1000° F. to convert them to products boiling below 1000° F. The charge may be a petroleum fraction having an initial boiling point of above 650° F. characterized by presence of an undesirable high content of components boiling above 1000° F., and sulfur, carbon residue and metals; and such charge may be subjected to hydrodesulfurization (HDS).

It is a particular feature of the process of this invention that it may permit treating of hydrocarbon charge, particularly those containing components boiling above about 1000° F., to form product which is characterized by an increased content of components boiling below 1000° F. and by decreased content of undesirable components typified by sulfur, metals, and carbon residue. It is another feature of the process of the instant invention that it provides the above-mentioned improvements with little or no additional sediment formation as measured by the Existent IP Sediment values of the 650° F.+ boiling point product.

A typical charge which may be utilized is an Arabian Medium/Heavy Vacuum Resid having the following properties:

TABLE

| Property | Value |
|---|---|
| API Gravity | 4.8 |
| 1000° F.+, vol % | 87.5 |
| 1000° F.+, w % | 88.5 |
| 1000° F.–, w % | 11.5 |
| Sulfur, w % | 5.0 |
| Total Nitrogen, wppm | 4480 |
| Hydrogen, w % | 10.27 |
| Carbon, w % | 84.26 |
| Alcor MCR, w % | 22.2 |
| Kinematic Viscosity, cSt | |
| @ 212° F. | 2430 |
| @ 250° F. | 410 |
| @ 300° F. | 117 |
| Pour Point, °F. | 110 |
| n-$C_5$ Insolubles, w % | 28.4 |
| n-$C_7$ Insolubles, w % | 9.96 |

TABLE-continued

| Property | Value |
| --- | --- |
| Toluene Insolubles, w % | 0.02 |
| Asphaltenes, w % | 9.94 |
| Metals, wppm | |
| Ni | 49 |
| V | 134 |
| Fe | 10 |
| Cu | 3 |
| Na | 49 |
| Total Metals wppm | 245 |
| Chloride, wppm | 28 |

In practice of the process of this invention (as typically conducted in a Robinson reactor in pilot plant operations), the charge hydrocarbon feed is contacted with hydrogen at isothermal hydrotreating conditions in the presence of catalyst. Pressure of operation may be 1500–10,000 psig, preferably 1800–2500 psig, say 2250 psig. Hydrogen is charged to the Robinson Reactor at a rate of 2000–10,000 SCFB, preferably 3000–8000, say 7000 SCFB. Liquid Hourly Space Velocity (LHSV) is typically 0.1–1.5, say 0.56 volumes of oil per hour per volume of liquid hold-up in the reactor. Temperature of operation is typically 700°–900° F., preferably 750°–875° F., say 770° F. Operation is essentially isothermal. The temperature may typically vary throughout the bed by less than about 20° F. As an alternative to one or more ebullated beds, reaction may be carried out in one or more continuously stirred tank reactors (CSTR's), such as Robinson reactors, in which the catalyst is exposed to a uniform quality of feed.

In one particularly preferred embodiment of the process of the instant invention, sulfur-and metal-containing hydrocarbon feedstock is catalytically hydrotreated with the above described catalyst using the H-OIL (TM) Process configuration. H-OIL is a proprietary ebullated bed process (co-owned by Hydrocarbon Research, Inc. and Texaco Development Corp.) for the catalytic hydrogenation of residua and heavy oils to produce upgraded distillate petroleum products. The ebullated bed system operates under essentially isothermal conditions and allows for exposure of catalyst particles to a uniform quality of feed.

In the H-OIL Process the residual oil is passed along with a hydrogen containing gas upwardly through a zone of ebullated hydrotreating catalyst at a reaction temperature of 750° F. to 875° F. The pressure is about 1500 psig to 10,000 psig and space velocity is 0.1 to 1.5 volume of oil per hour per volume of reactor. Hydrocarbon effluent is withdrawn from the zone of hydrogenation catalyst.

The catalyst support may be alumina. Although the alumina may be alpha, beta, theta, or gamma alumina, it is preferred to utilize gamma alumina.

The alumina substrate which may be employed is characterized by Total Surface Area, Total Pore Volume, and Pore Diameter Distribution. The Total Surface Area is 300–420, preferably 320–365, say 327 m²/g. The Total Pore Volume may be 0.95–1.35, preferably 1.05–1.15, say 1.06 cc/g.

The Pore Diameter Distribution is such that 50%–62.8%, preferably 50%–60%, say 54.4% of the Total Pore Volume is present as micropores of diameter of about 55–115 Å.

Micropores of pore diameter less than 55Å are present in amount of 0–10% preferably 1–6% say 1.5% of Total Pore Volume.

Micropores of pore diameter of 100–160Å are present in amount of 10–25%, say 17.9%

Macropores of pore diameter greater than 160Å are present in amount of 27–37.5 %, say 34.0%.

Macropores of diameter of greater than about 250Å are present in amount of about 20–30.5%, preferably 27–30.5%, say 27.8% of the Total Pore Volume.

Macropores of diameter of 500–10,000Å are preferably present in amount of about 18–24%, more preferably 18–22%, say 21.9%.

The Median Pore Diameter by Surface Area as calculated from mercury porosimetry, (i.e., that diameter above which half the calculated surface area appears—MPD(SA)), falls within the region with the highest concentration of micropores-namely, 70 Å–90Å, preferably 75 Å–85Å, say 82 Å.

It should be noted that the percentages of the several pores in the finished catalyst are essentially the same as in the charge gamma alumina substrate from which it is prepared—although the Total Surface Area of the finished catalyst may be 75–85%, say 77.0% of the charge gamma alumina substrate from which it is prepared. It should also be noted that the Median Pore Diameter by Surface Area from mercury porosimetry of the finished catalyst is essentially the same as that of the charge gamma alumina substrate from which it is prepared.

The alumina charge may be loaded with metals to yield a product catalyst containing a non-cobalt Group VIII metal oxide in amount of 2.5–6w %, preferably 2.8–3.5w %, a Group VI-B metal oxide in amount of 14.5–24w %, preferably 15.0–17.0w % and phosphorous oxide (P205) in amount of 0–6w %, preferably 1.5–3 w %.

The non-noble, non-cobalt Group VIII metal may be iron or nickel. This metal may be loaded onto the alumina typically from a 10–30%, say 15% aqueous solution of a water soluble salt (e.g. a nitrate, acetate, oxalate etc.). The preferred metal is nickel, employed as about a 16w % aqueous solution of nickel nitrate hexahydrate $Ni(NO_3)_2 \cdot 6H_2O$.

The Group VI-B metal may preferably be chromium, molybdenum, or tungsten, preferably molybdenum typically as a 10–41%, say 27% aqueous solution of a water-soluble salt such as ammonium molybdate $(NH_4)_2MoO_4$.

The phosphorus component, when employed, may be employed as a 0–4%, say 3w % aqueous solution of 85w % phosphoric acid $H_3PO_4$ in water.

These catalyst metals and phosphorus may be loaded onto the support by impregnating the latter with a solution of the former. Although it is preferred to load the metals and phosphorus simultaneously, it is possible to load each separately. It is preferred that the catalyst be impregnated by filling 90–105%, preferably 97–98%, say 97% of the substrate pore volume with the solution containing the requisite amounts of metals and phosphorus. Loading is followed by drying and calcining at 1000°–1150° F., say 1090° F. for 20 minutes-2 hours, say 30 minutes.

Another feature of the catalyst composition of the instant invention is that the ratio of the measured hydrodesulfurization (HDS) microactivity rate constant k of the catalyst of the instant invention to the measured HDS microactivity rate constant k of a standard hydroprocessing catalyst (namely, Criterion HDS-1443B, a commercially available, state-of-the-art catalyst for use in hydroprocessing resid oils), has a value of greater than 1.0, preferably greater than 1.5. As used in this description, the phrase "HDS microactivity" means the intrinsic hydrodesulfurization activity of a catalyst in the absence of diffusion, as measured according to the HDS Microactivity (HDS-MAT) Test, described as follows. In the HDS-MAT Test, a given catalyst is ground to a 30–60 mesh fraction and presulfided at 750° F. with a gas stream containing 10% $H_2S$/90% $H_2$. The catalyst is then exposed to a sulfur-containing feed, namely benzothiophene, which acts as a model sulfur compound probe, at reaction temperature and with flowing hydrogen for approximately 4 hours. Samples are taken periodically and analyzed by gas chromatography for the conversion of benzothiophene to ethylbenzene, thereby indicating the hydrodesulfurization properties of the catalyst being tested. The activity is calculated on both a catalyst weight and catalyst volume basis to account for any density differences between catalysts. The conditions for a typical HDS-MAT Test are as follows:

| | |
|---|---|
| Temperature: | about 550° F. |
| Pressure: | about atmospheric |
| Feedstock: | about 0.857 molar Benzothiophene in reagent grade normal heptane |
| Space Velocity: | 4 $hr^{-1}$ |
| Catalyst Charge: | 0.5 gram |

The kinetics of the reactor used in the HDS-MAT Test are first order, plug flow. At the abovestated temperature and space velocity, the rate constant, k, may be expressed as $$k = \ln(1/1\text{-HDS})$$

where HDS is the fractional hydrodesulfurization value obtained for a given catalyst at the abovestated conditions. A commercially available, state-of-the-art catalyst sold for use in hydroprocessing resid oils (Criterion HDS-1443B catalyst) was evaluated with the HDS-MAT Test under the abovestated conditions and was found to have a %HDS value of 73% on a weight basis and a corresponding rate constant k value of 1.3093. Additional details of the HDS-MAT Test can be found in U.S. Pat. No. 5,047,142 to Texaco as assignee of Dai et al., supra, incorporated herein by reference.

It is another feature of the catalyst composition of the instant invention that the oxide of molybdenum, preferably $MoO_3$, is distributed on the abovedescribed porous alumina support in such a manner that the molybdenum gradient is about 1.0. As used in this description, the phrase "molybdenum gradient" means that the ratio of a given catalyst pellet exterior molybdenum/aluminum atomic ratio to a given catalyst pellet interior molybdenum/aluminum atomic ratio, the atomic ratios being measured by X-Ray photoelectron spectroscopy (XPS), sometimes referred to as Electron Spectroscopy for Chemical Analysis (ESCA). It is theorized that the molybdenum gradient is strongly affected by the impregnation of molybdenum on the catalyst support and the subsequent drying of the catalyst during its preparation. ESCA data on both catalyst pellet exteriors and interiors were obtained on an ESCALAB MKII instrument available from V. G. Scientific Ltd., which uses a 1253.6 electron volt magnesium X-Ray source. Additional details of the determination of molybdenum gradient can be found in U.S. Pat. No. 5,047,142 to Texaco as assignee of Dai et al., supra, incorporated herein by reference.

The catalyst may be evaluated in a Robinson Reactor, a Continuously Stirred Tank Reactor (CSTR) which evaluates catalyst deactivation at conditions simulating the first stage of a two-stage H-Oil ebullated bed Unit. The feedstock is an Arabian Medium/Heavy Vacuum Resid of the type set forth above. Evaluation is carried out over 3–4 weeks to a catalyst age of about 4 bbl/lb.

In the practice of the process of this invention, the catalyst, preferably in the form of extruded cylinders of 0.0038 inch diameter and 0.15 inch length may be placed within a reactor. The particle size distribution is typically: <0.5 mm 0.5w % max; <5.0 mm 5w % max; <1.6 mm 10w % max; <2.5 mm 40w % max; and >15 mm 10w % max. The hydrocarbon charge is admitted to the bed of the Robinson Reactor in liquid phase at 650°–850° F., preferably 700°–800° F., say 770° F. and 1500–3500 psig, preferably 2000–3000 psig, say 2250 psig. Hydrogen gas is admitted with the hydrocarbon charge in amount of 3000–10,000 SCFB, preferably 5000–8000 SCFB, say 7000 SCFB. The hydrocarbon charge passes through the bed at a LHSV of 0.1–3, preferably 0.3–2, say 0.56. During operation, essentially isothermal conditions are maintained.

During passage through the Robinson reactor, the hydrocarbon feedstock may be converted to lower boiling products by the hydrotreating reaction. In a typical embodiment, a charge containing 60–95w %, say 89w % boiling above 1000° F. and 0–30w %, say 12w % boiling in the 600°–1000° F. range may be converted to a hydrotreated product containing only 35–65w %, say 51w% boiling above 1000° F.

ADVANTAGES OF THE INVENTION

It will be apparent to those skilled in the art that this invention is characterized by advantages including the following:

(i) It permits attainment of increased yield of hydrocarbon products boiling below 1000° F.;

(ii) It permits the attainment of the abovementioned increased yield with little or no additional sediment formation as measured by the Existent IP Sediment values of the 650° F.+ boiling point product.

(iii) It permits operation to yield highly desulfurized hydrocarbon product;

(iv) It permits operation to yield hydrocarbon product characterized by a lower content of carbon residue;

(v) It permits operation to yield hydrocarbon product characterized by lower content of metals.

Practice of the process of this invention will be apparent to those skilled in the art from the following wherein all parts are parts by weight unless otherwise stated. Control examples are designated by an asterisk.

DESCRIPTION OF SPECIFIC EMBODIMENTS

EXAMPLE I

In this example which represents the best mode presently known of carrying out the process of this example, the charge hydrocarbon is the Arabian Medium/Heavy Vacuum Resid having the properties set forth in the table supra. It should be noted that this charge hydrocarbon is particularly characterized by the presence of 87.5 v % of components having a boiling point above 1000° F., by a sulfur content of 5 w %, and by a total metals content of 245 wppm.

The catalyst is prepared from a gamma alumina support having the properties set forth in the Table which follows which notes the Total Surface Area TSA in square meters per gram of alumina, Total Pore Volume TPV in cubic centimeters per gram, and the Pore Volume PV, based in percent of TPV, arising from pores of noted diameter (Å).

TABLE

| Property | Value % Charge Alumina |
|---|---|
| TSA | 327 |
| TPV | 1.06 |
| PV < 55Å | 1.5 |
| PV 100–160Å | 17.9 |
| PV 55–115Å | 54.4 |
| PV > 250Å | 27.8 |
| PV > 160Å | 34.0 |
| PV 500–10,000Å | 21.9 |
| PV < 160Å | 66 |
| MPD(SA) in Ångstroms | 82 |

This alumina support is in the form of extrudates of diameter range of 0.035–0.041 inch.

The support is impregnated with a solution containing the requisite amounts of nickel, molybdenum, and phosphorus in amount to fill 97% of the substrate Total Pore Volume. The temperature of the wet extrudates is quickly raised to calcination temperature of about 1090° F. and held for 30 minutes—after which the catalyst is allowed to cool.

The product catalyst is characterized as follows:

TABLE

| Component | w % |
|---|---|
| $MoO_3$ | 16.6 |
| NiO | 2.9 |
| CoO | None |
| $SiO_2$ | 1.8 |
| $SO_4$ | 0.6 |
| $Na_2O$ | 0.01 |
| $P_2O_5$ | 2.5 |
| TSA m²/g | 252 |
| TPV cc/g | 0.83 |
| PV < 55Å | 2.6% |
| PV 100–160Å | 15.9% |
| PV 55–115Å | 53.9% |
| PV > 250Å | 29.2% |
| PV > 160Å | 34.8% |
| PV 500–10,000Å | 23.4% |
| MPD(SA) in Ångstroms | 79 |

This catalyst is placed within the reaction vessel (the Robinson Reactor) in which the feed is uniformly contacted with hydrogen at isothermal conditions.

Charge hydrocarbon is admitted in liquid phase at 770° F. and 2250 psig to the Robinson Reactor at a space velocity LHSV of 0.56 volumes of oil per hour per volume of liquid hold up in the Robinson Reactor. Hydrogen is admitted in amount of 7000 SCFB.

Product is collected and analyzed to yield the following data:

TABLE

| Property | Value |
|---|---|
| % Sulfur Removal | 62.4 |
| % Carbon Residue Reduction | 43.2 |
| % Ni Removal | 51.0 |
| % V Removal | 69.5 |
| % Hydroconversion of 1000° F.+ to 1000° F. - Materials (w % Basis) | 46.4 |
| % Hydroconversion Advantage (w % Basis) | 6.2 |

From the above Table, it is apparent that the process of the instant invention permits increasing the conversion of materials boiling above 1000° F. by 46.4 w %; and sulfur, carbon residue, and metals are removed.

Upon distillation to recover (i) a first cut from the initial boiling point to 650° F., (ii) a second cut form 650° F. to 1000° F., and (iii) a third cut above 1000° F., the following is noted:

TABLE

| | EXAMPLE I Product |
|---|---|
| Cut 1: up to 650° F. | |
| Specific Gravity, g/cc | 0.86 |
| Sulfur, w % | 0.29 |
| Cut 2: 650° F.–1000° F. | |
| Specific Gravity, g/cc | 0.93 |
| Sulfur, w % | 0.99 |
| Cut 3: 1000° F.+ | |
| Specific Gravity, g/cc | 1.04 |
| Sulfur, w % | 3.21 |

From the above Table, it is apparent that the Sulfur content is decreased in all of the product fractions (from 5.0 w % in the feed).

The preferred process of this invention typically shows a Hydroconversion Advantage (when measured against the prior art commercial control catalyst of Example VI*) of 6.4±0.2 on a weight percent basis and 6.35±0.55 when measured on a volume basis when compared to the conversion levels obtained using a typical commercial ebullated bed catalyst.

The Hydroconversion Advantage is calculated as the weight or volume % of 1000° F.+ conversion of a particular example (X) minus the weight or volume % of 1000° F.+ conversion of a standard (Y) this difference being divided by the weight or volume of 1000° F.+ conversion of typical commercial ebullated bed catalyst example (X).

$$\text{Hydroconversion Advantage} = \frac{X - Y}{Y}$$

Upon distillation to recover (iv) a cut which boils at temperatures of about 650° F. and higher, the following is noted:

TABLE

| Cut 4: 650° F.+ | EXAMPLE I Product |
|---|---|
| Existent IP Sediment, w % | 0.01 |
| Accelerated IP Sediment, w % | 0.00 |

From the above Table, it is apparent that the process of the instant invention can operated at about 46 vol % conversion of feed components with boiling points greater than 1000° F. to products with boiling points less than 1000° F. without appreciable sediment make.

EXAMPLE II–VI*

In experimental Examples II–V*, the catalyst is prepared as in Example I except that it contains different amounts of catalytic metals and different TPV, TSA, and Pore Size Distribution—all as set forth in the Table which follows. Example III* is prepared with a greater percentage of Total Pore Volume in micropores with diameters between 55–115Å and with a lesser percentage of Total Pore Volume in macropores with diameters greater than 250Å than is allowed for catalysts employed in the process of the instant invention. Example V, is prepared using the same alumina support as Example I and using the same preparation procedure but in Example V*, cobalt is substituted for nickel. Also included is control Example VI* which utilizes a commercially available catalyst (the HDS-1443B brand of catalyst marketed by Criterion Catalyst Co.).

TABLE

| | I<br>NiMoP | II<br>NiMoP | III*<br>NiMoP | IV<br>NiMoP | V*<br>CoMoP | VI*<br>NiMo |
|---|---|---|---|---|---|---|
| CATALYST PROPERTIES | | | | | | |
| Chemical Composition (w %): | | | | | | |
| $MoO_3$ | 16.6 | 16.4 | 14.5–16.5 | 15.3 | 15.2 | 11.5–14.5 |
| NiO | 2.9 | 3.2 | 3.0–3.5 | 3.1 | None | 3.2–4.0 |
| CoO | None | None | None | None | 2.9 | None |
| $SiO_2$ | 1.8 | ≦2.5 | ≦2.5 | ≦2.5 | ≦2.5 | ≦1.0 |
| $SO_4$ | 0.6 | ≦0.8 | ≦0.8 | ≦0.8 | ≦0.8 | ≦0.8 |
| $Na_2O$ | 0.01 | ≦0.1 | ≦0.1 | ≦0.1 | ≦0.1 | ≦0.05 |
| $P_2O_5$ | 2.5 | 1.9 | 2.3 | 1.8 | 2.3 | ≦0.2 |
| Surface Area ($m^2/g$) | 252 | 264 | 242 | 255 | 277 | 314 |
| Micropore Mode (Å)# | 64 | 74 | 73 | 78 | 66 | 46 |
| TPV (cc/g) | 0.83 | 0.82 | 0.67 | 0.75 | 0.84 | 0.74 |
| PV 30Å–80Å (% TPV) | 30.6 | 27.3 | 24.6 | 23.7 | 35.0 | 53.3 |
| PV < 55Å (% TPV) | 2.6 | 1.9 | 0.3 | 1.9 | 3.4 | 25.1 |
| PV 100Å–160Å (% TPV) | 15.9 | 13.6 | 18.9 | 16.1 | 15.1 | 5.6 |
| PV 55Å–115Å (% TPV) | 53.9 | 58.6 | 71.6 | 62.8 | 55.6 | 34.9 |
| PV 55Å–115Å (% PV < 250Å) | 76.1 | 81.5 | 85.2 | 81.4 | 76.2 | 53.0 |
| PV > 250Å (% TPV) | 29.2 | 28.2 | 15.9 | 22.9 | 27.1 | 34.1 |
| PV > 160Å (% TPV) | 34.8 | 32.6 | 19.8 | 27.6 | 32.7 | 37.4 |
| PV 500Å–10,000Å (% TPV) | 23.4 | 22.6 | 11.7 | 18.2 | 21.4 | 29.8 |
| PV > 1200Å (cc/g) | 0.16 | 0.15 | 0.05 | 0.10 | 0.14 | 0.17 |
| PV > 4000Å (cc/g) | 0.055 | 0.023 | 0.001 | 0.007 | 0.032 | 0.066 |
| Median Pore Diameter by Surface Area## (Å) | 79 | 82 | 85 | 85 | 76 | 55 |
| HDS-MAT Test### | 1.7 | 1.8 | 1.8 | 2.1 | Not Applicable | 1.0 (Basis) |
| Molybdenum Grad.@@@ | 1.0 | 1.0 | 1.1 | 1.3 | 1.1 | 1.3 | maximum differential volume ($dV/dD_{MAX}$) in nitrogen desorption data
median pore diameter by surface area as determined by mercury porosimetry, i.e., that diameter above which half the calculated surface area appears
k measured/k standard (HDS-1443B)
@@@$(Mo/Al)_{exterior}/(Mo/Al)_{crushed}$ (ratios measured by ESCA)

Pore Volume is determined using a Micromeritics Autopore 9220 mercury porosimeter.

The Hydroconversion Advantage calculated for Examples I, II, III*, IV, V, and VI*, are as follows:

TABLE

| | Hydroconversion Advantage | |
|---|---|---|
| Example | W % Basis | Vol % Basis |
| I | 6.2 | 5.8 |
| II | 6.6 | 6.9 |
| III* | 8.2 | 7.4 |
| IV | 8.0 | 7.9 |
| V* | −3.7 | −3.0 |
| VI* (Basis) | 0 | 0 |

The Average Catalytic Activity in W % and the Average Catalytic Activity in Vol % are determined over the age range of 0.1–3.0 barrels per pound.

From the above Table, the following conclusions may be drawn:

(i) The catalysts of Examples I, II, and IV of this invention permit attainment of hydroconversion of feedstock components having a boiling point above about 1000° F. to product components having a boiling point less than 1000° F. when used in an isothermal hydrogen treating process wherein the catalyst is contacted with a uniform hydrogen and hydrocarbon feed;

(ii) The catalyst of Example V*, which is prepared using the same alumina support as Example I and using the same preparation procedure but with cobalt substituting for nickel, did not permit attainment of hydroconversion of feedstock components having a boiling point above about 1000° F. to product components having a boiling point less than 1000° F.;

(iii) The catalyst of Comparative Example III*, which is a control example, also permits attainment of hydroconversion of feedstock components having a boiling point above about 1000° F. to product components having a boiling point less than 1000° F.

The sediment levels found for the 650° F.+ boiling point products for Examples I, II, III*, IV, and VI*, are as follows:

TABLE

| Example | W % 650° F.+ IP Sediment Values | |
|---|---|---|
| | Existent | Accelerated |
| I | 0.01 | 0.00 |
| II | 0.00 | 0.00 |
| III* | 0.18 | 0.51 |
| IV | 0.01 | 0.15 |
| VI* (Basis) | 0.00 | 0.00 |

The Average w % 650° F.+ IP Sediment Values are determined over the age range of 0.1–3.0 barrels per pound.

From the above Tables, the following conclusions may be drawn:

(i) The catalysts of Examples I, II, and IV of this invention permit attainment of hydroconversion of feedstock components having a boiling point above about 1000° F. to product components having a boiling point less than 1000° F. with little or no additional sediment formation as measured by the Existent IP Sediment values of the 650° F.+ boiling point product;

(ii) The preferred catalysts of Examples I and II of this invention permit attainment of hydroconversion of feedstock components having a boiling point above about 1000° F. to product components having a boiling point less than 1000° F. with little or no additional, potential sediment formation as measured by the Accelerated IP Sediment values of the 650° F.+ boiling point product;

(iii) The catalyst of Comparative Example III*, which is a control example, also permits attainment of hydroconversion of feedstock components having a boiling point above about 1000° F. to product components having a boiling point less than 1000° F. but produces sediment as measured by the Existent IP Sediment values of the 650° F.+ boiling point product and produces potential sediment as measured by the Accelerated IP Sediment values of the 650° F.+ boiling point product.

A summary of properties found for Examples I, II, III*, IV, and VI*, are as follows:

TABLE

| Property | Example | | | | |
|---|---|---|---|---|---|
| | I | II | III* | IV | VI* |
| % S Removal | 62.4 | 62.6 | 64.4 | 64.1 | 58.1 |
| % Carbon Residue Reduction | 43.2 | 42.7 | 47.4 | 48.2 | 40.3 |
| % Ni Removal | 51.0 | 51.3 | 47.0 | 50.7 | 48.8 |
| % V Removal | 69.5 | 71.3 | 66.6 | 69.5 | 73.3 |
| % Hydroconversion °F. 1000° F.+ to 1000° F. Materials (Weight Basis) | 46.4 | 46.6 | 47.3 | 47.2 | 43.7 |
| Hydroconversion Advantage (Weight Basis) | 6.2 | 6.6 | 8.2 | 8.0 | 0.0 |

From the above Tables, the following conclusions may be drawn:

(i) The catalysts of Examples I, II, and IV of this invention permit attainment of desirable results when used in an isothermal hydrogen treating process wherein the catalyst is contacted with a uniform hydrogen and hydrocarbon feed;

(ii) the process of the instant invention permits attainment of hydroconversion of feedstock components having a boiling point above about 1000° F. to product components having a boiling point less than 1000° F.;

(iii) the process of the instant invention permits attainment of the abovementioned increased hydroconversion with little or no additional sediment formation as measured by the Existent IP Sediment values of the 650° F.+ boiling point product;

(iv) The preferred catalysts of Examples I and II of this invention permit attainment of the abovementioned increased hydroconversion with little or no additional, potential sediment formation as measured by the Accelerated IP Sediment values of the 650° F.+ boiling point product;

(v) The process of the instant invention permits a high level of desulfurization (HDS) of the charge; and (vi) The process of the instant invention permits a high level of carbon residue reduction (CRR).

(vii) The process of the instant invention permits a high level of nickel removal (HDNi) of the charge.

It was noted that the process of the instant invention employing the catalyst of Example I at [(79/55)×100]%, or 144%, of the Median Pore Diameter by Surface Area from mercury porosimetry of the catalyst of Control Example VI*, or [(64/46)×100]%, or 139%, of the micropore mode of the catalyst of Control Example VI*, as defined by the maximum $(dV/dD_{MAX})$ in the nitrogen desorption data, gives higher levels of carbon residue reduction than those which were observed with the employment of the catalyst of Example I. It was also noted that the process of the instant invention employing the catalyst of Example II at [(82/55)× 100]%, or 149% of the Median Pore Diameter by Surface Area from mercury porosimetry of the catalyst of Control Example VI*, or [74/46)×100]%, or 161%, of the micropore mode of the catalyst of Control Example VI*, as defined by the maximum $(dV/dD_{MAX})$ in the nitrogen desorption data, gives higher levels of vanadium removal, and very slightly higher levels of nickel removal, sulfur removal, and hydroconversion of feedstock components having a boiling point above about 1000° F. to product components having a boiling point less than 1000° F., than those which were observed with the employment of the catalyst of Example I.

Upon distillation to recover (i) a first cut from the initial boiling point to 650° F., (ii) a second cut form 650° F. to 1000° F., and (iii) a third cut above 1000° F., the following is noted:

TABLE

|  | I | II | III* | IV | VI* |
|---|---|---|---|---|---|
| Cut 1: up to 650° F. | | | | | |
| Specific Gravity, g/cc | 0.86 | 0.85 | 0.85 | 0.85 | 0.85 |
| Sulfur, w % | 0.29 | 0.26 | 0.24 | 0.23 | 0.32 |
| Cut 2: 650° F.–1000° F. | | | | | |
| Specific Gravity, g/cc | 0.93 | 0.93 | 0.93 | 0.93 | 0.94 |
| Sulfur, w % | 0.99 | 1.05 | 0.83 | 0.85 | 1.21 |
| Nitrogen, wppm | 2200 | 2200 | 1700 | 2108 | 2400 |
| Cut 3: 1000° F.+ | | | | | |
| Specific Gravity, g/cc | 1.04 | 1.04 | 1.03 | 1.04 | 1.04 |
| Sulfur, w % | 3.21 | 3.19 | 3.42 | 3.23 | 3.40 |

From the above Table, the following conclusions may be drawn:

(i) The catalysts of Examples I, II, and IV of this invention decrease the sulfur contents in all of the product fractions (from 5.0 w % in the feed);

(ii) The catalysts of Examples I, II, and IV of this invention decrease the sulfur contents of the 1000° F. product fraction relative to those levels experienced with Comparative Example III* and Control Example VI*.

(iii) The catalysts of Examples I, II, and IV of this invention decrease sulfur and nitrogen contents of the 650° F.–1000° F. product fraction relative to those levels experienced with Control Example VI* but not as much as Comparative Example III*.

EXAMPLE VII

In this example, the charge hydrocarbon is a different batch of Arabian Medium/Heavy Vacuum Resid having the following properties:

TABLE

| Property | Value |
|---|---|
| API Gravity | 5.2 |
| 1000° F.+, vol % | 89.1 |
| 1000° F.+, w % | 90.1 |
| 1000° F.– w % | 9.9 |
| Sulfur, w % | 5.69 |
| Total Nitrogen, wppm | 4300 |
| Hydrogen, w % | 9.99 |
| Carbon, w % | 82.57 |
| Alcor MCR, w % | 22.8 |
| Kinematic Viscosity, cSt | |
| @ 212° F. | 3146 |
| @ 250° F. | 862 |
| @ 300° F. | 258 |
| Pour Point, °F. | 120 |
| n-$C_5$ Insolubles, w % | 33.77 |
| n-$C_7$ Insolubles, w % | 12.37 |
| Toluene Insolubles, w % | 0.04 |
| Asphaltenes, w % | 12.33 |

TABLE-continued

| Property | Value |
|---|---|
| Metals, wppm | |
| Ni | 57 |
| V | 149 |
| Fe | 10 |
| Cu | 0.4 |
| Na | 7.5 |
| Total Metals wppm | 224 |

It will be noted that this charge hydrocarbon is particularly characterized by the presence of 89.1 vol % of components having a boiling point above 1000° F., by a sulfur content of 5.69 wt %, and by a total metals content of 224 wppm.

The catalyst is the same as that described in Example II, supra. This catalyst is placed within the reaction vessel (the Robinson reactor) in which the feed is uniformly contacted with hydrogen at isothermal conditions.

Charge hydrocarbon is admitted in liquid phase at 770° F. and 2250 psig to the Robinson Reactor at a Liquid Hourly Space Velocity of 0.56 volumes of oil per hour per volume of liquid hold-up in the Robinson Reactor. Hydrogen is admitted in amount of 7000 SCFB. The evaluation is conducted in a similar manner to those described above for Examples I–VI*, except that the temperature of the evaluation is first raised to 775° F., then 780° F., and finally, 785° F., in a step-wise manner in the course of approximately 4 weeks.

Upon distillation (i) of a first total liquid product cut to recover a cut with a boiling point greater than or equal to about 1000° F. to use in the determination of the hydroconversion of 1000° F.+ boiling point material to 1000° F.– products, and, (ii) of a second total liquid product cut to recover a cut with a boiling point greater than or equal to 650° F. to use in the determination of Existent IP Sediment values, the following is noted:

TABLE

| Catalyst Age (BBLS/LB) | Nominal Temperature (°F.) | Hydroconversion of 1000° F.+ to 1000° F.– Materials (Vol %) | Existent IP Sediment (W %) |
|---|---|---|---|
| 0.4–1.9 | 770 | 45.6 | 0.01 |
| 2.3–2.8 | 775 | 48.7 | 0.09* |
| 3.2–3.3 | 780 | 52.7 | 0.13 |
| 3.8–4.0 | 785 | 56.7 | 0.16 |

*Excluding one cut at 0.31 w %, check-test 0.26 w %.

From the above Table, it is apparent that the catalyst of Example VII permits further increasing the conversion of feedstocks components boiling above about 1000° F. to products boiling below about 1000° F. with small incremental changes in temperature. It is also apparent from the above Table that increasing conversion is accompanied by small incremental changes in Existent IP sediment values for the 650° F.+ product stream. Undesirable high Existent IP sediment values for the 650° F.+ product stream may be reached at very high levels of conversion of feedstocks components boiling above about 1000° F. to products boiling below about 1000° F.

Upon examination of Total Liquid Product samples, the following is noted:

TABLE

| Catalyst Age (BBLS/LB) | Nominal Temperature (°F.) | Sulfur Removal (%) | Carbon Residue Reduction (%) | Nickel Removal (%) | Vanadium Removal (%) |
|---|---|---|---|---|---|
| 0.4–1.9 | 770 | 65 | 43 | 55 | 63 |
| 2.3–2.8 | 775 | 61 | 41 | 51 | 61 |
| 3.2–3.3 | 780 | 61 | 43 | 54.6 | 63 |
| About 3.8 | 785 | 61 | 45 | 55.3 | 66 |

It is noted that in the first temperature region (i.e., about 770° F.), at a very young catalyst age (i.e., about 0.4–1.9 barrels per pound catalyst age), activities are very high, particularly for sulfur removal. This is a consequence of including data in the average removal rates at extremely low catalyst ages. After the first temperature region, from the above Tables, the following conclusions may be drawn:

(i) The catalyst of Example VII permits increasing the conversion of feedstocks components boiling above about 1000° F. to products boiling below about 1000° F. with small incremental changes in temperature;

(ii) The increasing conversion of the process of the instant invention with small incremental changes in temperature is accompanied by small incremental changes in Existent IP sediment values for the 650° F.+ product stream.

(iii) The process of the instant invention permits a high level of desulfurization (HDS) of the charge with small incremental changes in temperature;

(iv) The process of the instant invention permits increasing the high level of carbon residue reduction (CRR) of the charge with small incremental changes in temperature;

(v) The process of the instant invention permits increasing the high level of denickelization (HDNi) of the charge with small incremental changes in temperature; and, (vi) The process of the instant invention permits increasing the removal rate of vanadium from the charge with small incremental changes in temperature;

Although this invention has been illustrated by reference to specific embodiments, it will be apparent to those skilled in the art that various charges and modifications may be made which clearly fall within the scope of the invention.

What is claimed:

1. A catalyst composition consisting essentially of a porous alumina support bearing 2.5–6 wt % of a non-cobalt Group VIII metal oxide, 14.5–24 wt % of a Group VI-B oxide selected from an oxide of tungsten and molybdenum, and 0–4 wt % of a phosphorus oxide, said catalyst having a Total Surface Area of 240–320 m$^2$/g, Pore Volume of 0.65–0.90 cc/g, and a Pore Diameter Distribution whereby 50–62.8% of the Total Pore Volume is present as micropores of diameter 55–115 Å, 27.5–37% of the Total Pore Volume is present in large pores of a diameter greater than 160 Å, and 20–30.5% of the Total Pore Volume is present as macropores of diameter greater than 250 Å.

2. A catalyst composition as claimed in claim 1 wherein said Group VIII metal is present in amount of 2.8–3.5 wt. % as oxide.

3. A catalyst composition as claimed in claim 1 wherein said Group VI-B metal is present in amount of 15.0–17.0 wt. % as oxide.

4. A catalyst composition as claimed in claim 1 wherein said phosphorus oxide is present in amount of 1.5–3 wt. %.

5. A catalyst composition as claimed in claim 1 wherein said porous support is alumina.

6. A catalyst composition as claimed in claim 1 wherein said Group VIII metal is nickel.

7. A catalyst composition as claimed in claim 1 wherein said catalyst has a Total Surface Area of 240–280 m$^2$/g.

8. A catalyst composition as claimed in claim 1 wherein said catalyst has a Total Pore Volume of 0.80–0.90 cc/g.

* * * * *